United States Patent
Yonekawa

(10) Patent No.: US 10,063,668 B2
(45) Date of Patent: Aug. 28, 2018

(54) INFORMATION PROCESSING APPARATUS, CONTROL METHOD THEREOF, AND COMPUTER PROGRAM

(75) Inventor: Satoshi Yonekawa, Saitama (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 909 days.

(21) Appl. No.: 13/358,200

(22) Filed: Jan. 25, 2012

(65) Prior Publication Data

US 2012/0215836 A1 Aug. 23, 2012

(30) Foreign Application Priority Data

Feb. 17, 2011 (JP) .................................. 2011-032560
Dec. 5, 2011 (JP) .................................. 2011-266247

(51) Int. Cl.
*G06F 15/173* (2006.01)
*H04L 29/06* (2006.01)

(52) U.S. Cl.
CPC ........ *H04L 69/161* (2013.01); *H04L 63/0227* (2013.01); *H04L 63/10* (2013.01)

(58) Field of Classification Search
CPC .... H04L 63/10; H04L 63/0227; H04L 69/161
See application file for complete search history.

(56) References Cited

U.S. PATENT DOCUMENTS

| | | | |
|---|---|---|---|
| 6,560,660 B1 * | 5/2003 | Flanagin | 710/15 |
| 7,577,998 B1 * | 8/2009 | Crosbie | G06F 21/554 707/999.009 |
| 7,990,847 B1 * | 8/2011 | Leroy | H04L 43/0817 370/216 |
| 8,230,488 B2 | 7/2012 | Chiba | 726/7 |

(Continued)

FOREIGN PATENT DOCUMENTS

| | | | |
|---|---|---|---|
| JP | 2003-032252 A | 1/2003 | |
| JP | 2005-227982 A | 8/2005 | |

(Continued)

OTHER PUBLICATIONS

JP Office Action dated Jul. 10, 2015 issued in JP Application No. 2011-266247—Partial English Translation.

*Primary Examiner* — Tonia L Dollinger
*Assistant Examiner* — Steven C Nguyen
(74) *Attorney, Agent, or Firm* — Fitzpatrick, Cella, Harper & Scinto

(57) ABSTRACT

An information processing apparatus in which a process communicating with an external apparatus operates is provided. The information processing apparatus includes a first acquisition unit configured to acquire identification information for identifying the process; a second acquisition unit configured to acquire port information indicating a characteristic of a communication port used by the process to communicate with the external apparatus; and a control unit configured to control a storage unit to store the port information and the identification information in correspondence with each other, wherein the second acquisition unit is further configured to acquire the port information by filtering an input or output of driver software used by the process to use the communication port, monitoring communication between the process and an application programming interface used to access the communication port, or a port monitoring interface.

13 Claims, 14 Drawing Sheets

(56) References Cited

U.S. PATENT DOCUMENTS

| | | | |
|---|---|---|---|
| 8,413,172 B2 | 4/2013 | Sng | 719/321 |
| 2002/0196782 A1* | 12/2002 | Furukawa | H04M 7/128 370/352 |
| 2004/0264463 A1* | 12/2004 | Fukushima | H04L 12/184 370/390 |
| 2006/0085857 A1* | 4/2006 | Omote et al. | 726/24 |
| 2007/0198735 A1* | 8/2007 | Kim | H04L 29/12358 709/230 |
| 2008/0115190 A1* | 5/2008 | Aaron | 726/1 |
| 2008/0244070 A1 | 10/2008 | Kita et al. | |
| 2009/0205031 A1* | 8/2009 | Sato et al. | 726/7 |
| 2010/0121964 A1* | 5/2010 | Rowles | H04L 47/10 709/229 |
| 2010/0154037 A1* | 6/2010 | Sabin | G06F 9/54 726/5 |
| 2012/0166657 A1* | 6/2012 | Toumura | H04L 67/1038 709/228 |

FOREIGN PATENT DOCUMENTS

| | | | | |
|---|---|---|---|---|
| JP | 2006-119754 | | 5/2006 | G06F 21/22 |
| JP | 2006-202196 | | 8/2006 | A63F 13/10 |
| JP | 2007-129534 | | 5/2007 | G06F 13/00 |
| JP | 2008-276760 | A | 11/2008 | |
| JP | 2009-151479 | | 7/2009 | G06F 13/00 |
| JP | 2010-049676 | | 3/2010 | G06F 13/00 |
| JP | 2010-211257 | | 9/2010 | G06F 21/20 |

\* cited by examiner

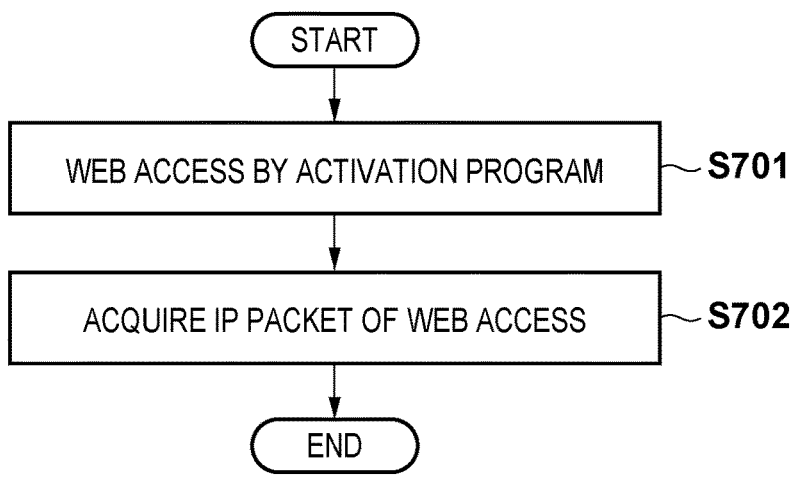
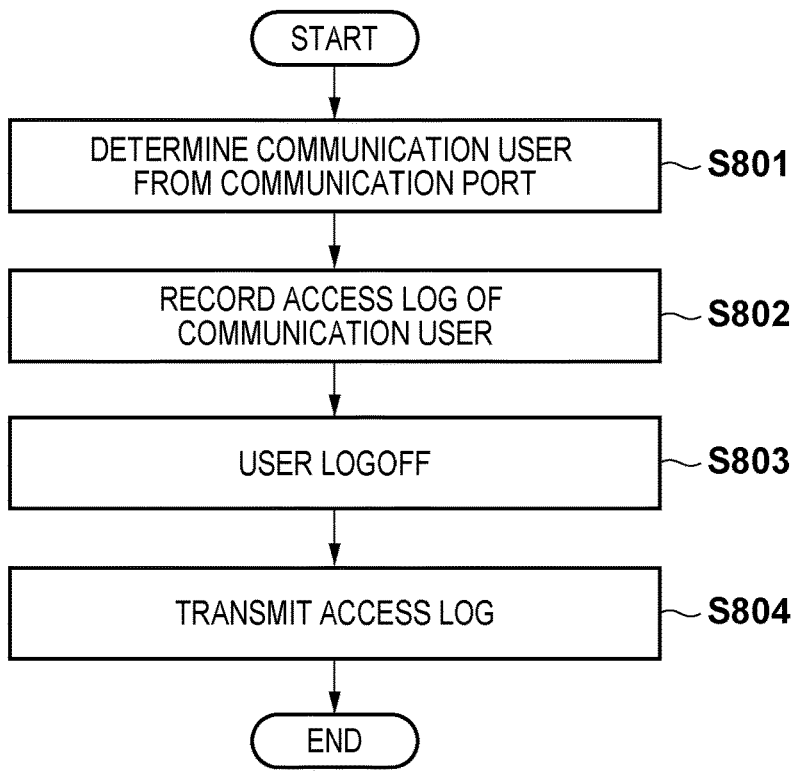

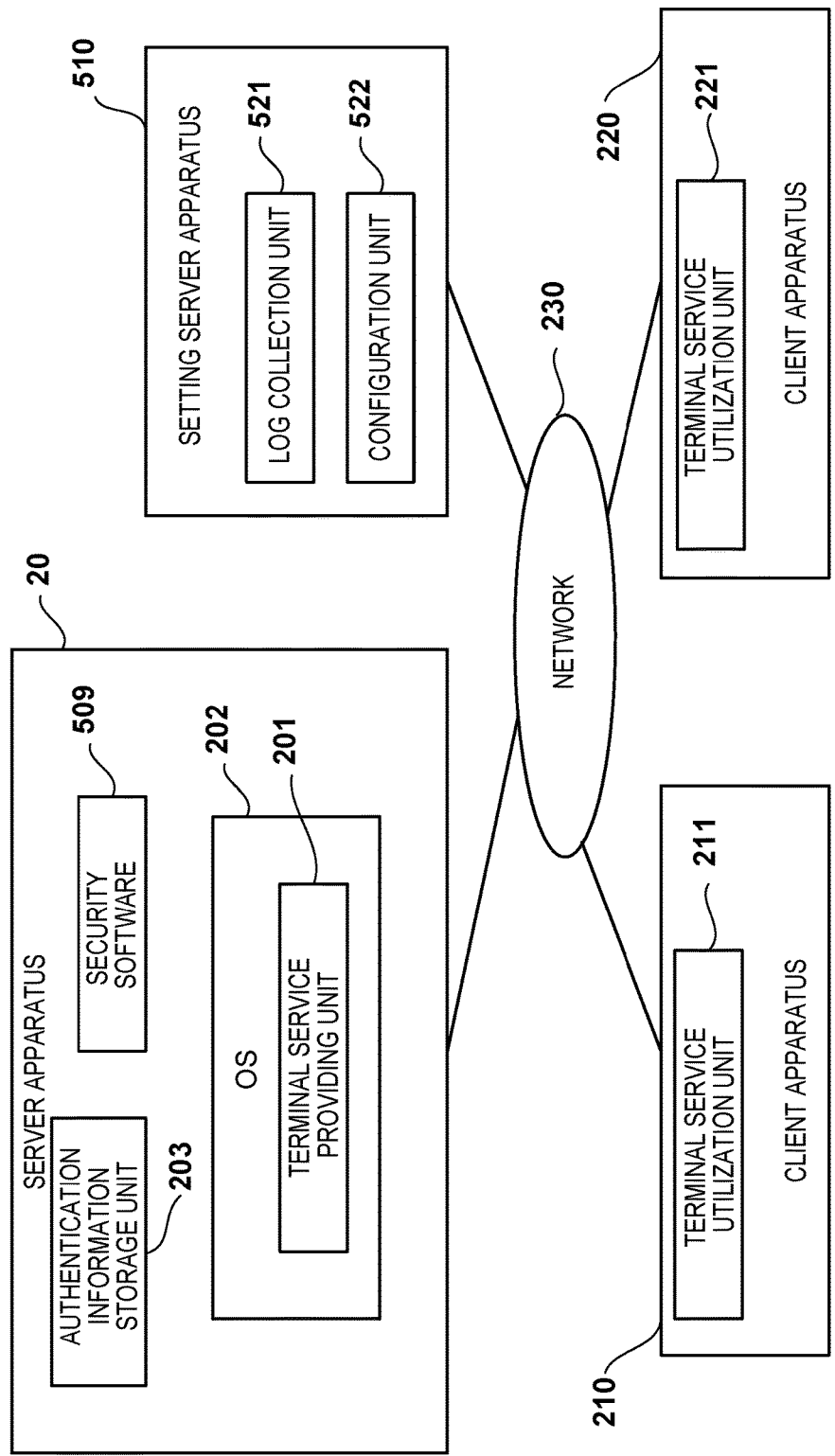

INFORMATION PROCESSING APPARATUS, CONTROL METHOD THEREOF, AND COMPUTER PROGRAM

BACKGROUND OF THE INVENTION

Field of the Invention

The present invention relates to an information processing apparatus and control method thereof, and computer program and, more particularly, to a technique of acquiring the log of access to an external apparatus.

Description of the Related Art

With the popularization of personal computers and the progress of communication techniques, a broad range of users including children use the Internet. Because of many advantages of the Internet, access to the Internet is substantially indispensable for our daily activities at business, school, and home.

However, the wide spread of the Internet has recently posed a problem that students, children, and workers access specific undesirable Web sites. As another problem, confidential information may leak depending on the usage of the Internet by a user.

To monitor access to a Web site by a user to solve these problems, Japanese Patent Laid-Open No. 2008-276760 discloses a configuration which acquires an access log by packet capturing.

The configuration in Japanese Patent Laid-Open No. 2008-276760 can grasp a Web site accessed by a computer, but cannot grasp the situation in which the access was made. That is, it cannot be determined whether the Web site was accessed by a user using a browser or for automatic update of a predetermined application, or the access was made due to virus infection and was not intended by the user.

Also, user friendliness is poor because log acquisition cannot be selected. For example, the configuration cannot be set to leave on record a log of access by a user using a Web browser while not leaving on record a log of access by automatic update. In addition, Web access control suited to the user environment cannot be performed. For example, it cannot be set to inhibit browsing of a Web site but permit automatic update.

SUMMARY OF THE INVENTION

The present invention has been made to solve the above problems, and provides an information processing apparatus capable of grasping and managing access to an external apparatus for each process, and a control method thereof.

According to a first aspect of the present invention, an information processing apparatus in which a process communicating with an external apparatus operates is provided. The information processing apparatus includes a first acquisition unit configured to acquire identification information for identifying the process; a second acquisition unit configured to acquire port information indicating a characteristic of a communication port used by the process to communicate with the external apparatus; and a control unit configured to control a storage unit to store the port information and the identification information in correspondence with each other, wherein the second acquisition unit is further configured to acquire the port information by filtering an input or output of driver software used by the process to use the communication port, monitoring communication between the process and an application programming interface used to access the communication port, or a port monitoring interface.

According to a second aspect of the present invention, an information processing apparatus in which a process communicating with an external apparatus operates is provided. The information processing apparatus includes a first acquisition unit configured to acquire identification information for identifying the process; a second acquisition unit configured to acquire port information indicating a characteristic of a communication port used by the process to communicate with the external apparatus; and a control unit configured to control a storage unit to store the port information and the identification information in correspondence with each other, wherein the port information indicating a characteristic of a communication port includes a port type.

According to a third aspect of the present invention, a method of controlling an information processing apparatus in which a process communicating with an external apparatus operates is provided. The method includes a first acquisition step of causing a first acquisition unit to acquire identification information for identifying the process; a second acquisition step of causing a second acquisition unit to acquire port information indicating a characteristic of a communication port used by the process to communicate with the external apparatus; and a control step of causing a control unit to control a storage unit to store the port information and the identification information in correspondence with each other, wherein the port information is acquired by filtering an input or output of driver software used by the process to use the communication port, monitoring communication between the process and an application programming interface used to access the communication port, or a port monitoring interface.

According to a fourth aspect of the present invention, a method of controlling an information processing apparatus in which a process communicating with an external apparatus operates is provided. The method includes a first acquisition step of causing a first acquisition unit to acquire identification information for identifying the process; a second acquisition step of causing a second acquisition unit to acquire port information indicating a characteristic of a communication port used by the process to communicate with the external apparatus; and a control step of causing a control unit to control a storage unit to store the port information and the identification information in correspondence with each other, wherein the port information indicating a characteristic of a communication port includes a port type.

Further features of the present invention will become apparent from the following description of exemplary embodiments with reference to the attached drawings.

BRIEF DESCRIPTION OF THE DRAWINGS

FIG. 12 is a flowchart showing IP communication monitoring processing in a terminal apparatus according to an embodiment;

FIG. 13 is a flowchart showing access log acquisition processing in a terminal apparatus according to an embodiment;

FIG. 15 is a block diagram showing the configurations of an information processing system and Internet access information setting server simultaneously usable by a plurality of users according to an embodiment.

DESCRIPTION OF THE EMBODIMENTS

Preferred embodiments of the present invention will now be described in detail with reference to the accompanying drawings.

First Embodiment (Information Processing System)

Figure 1:
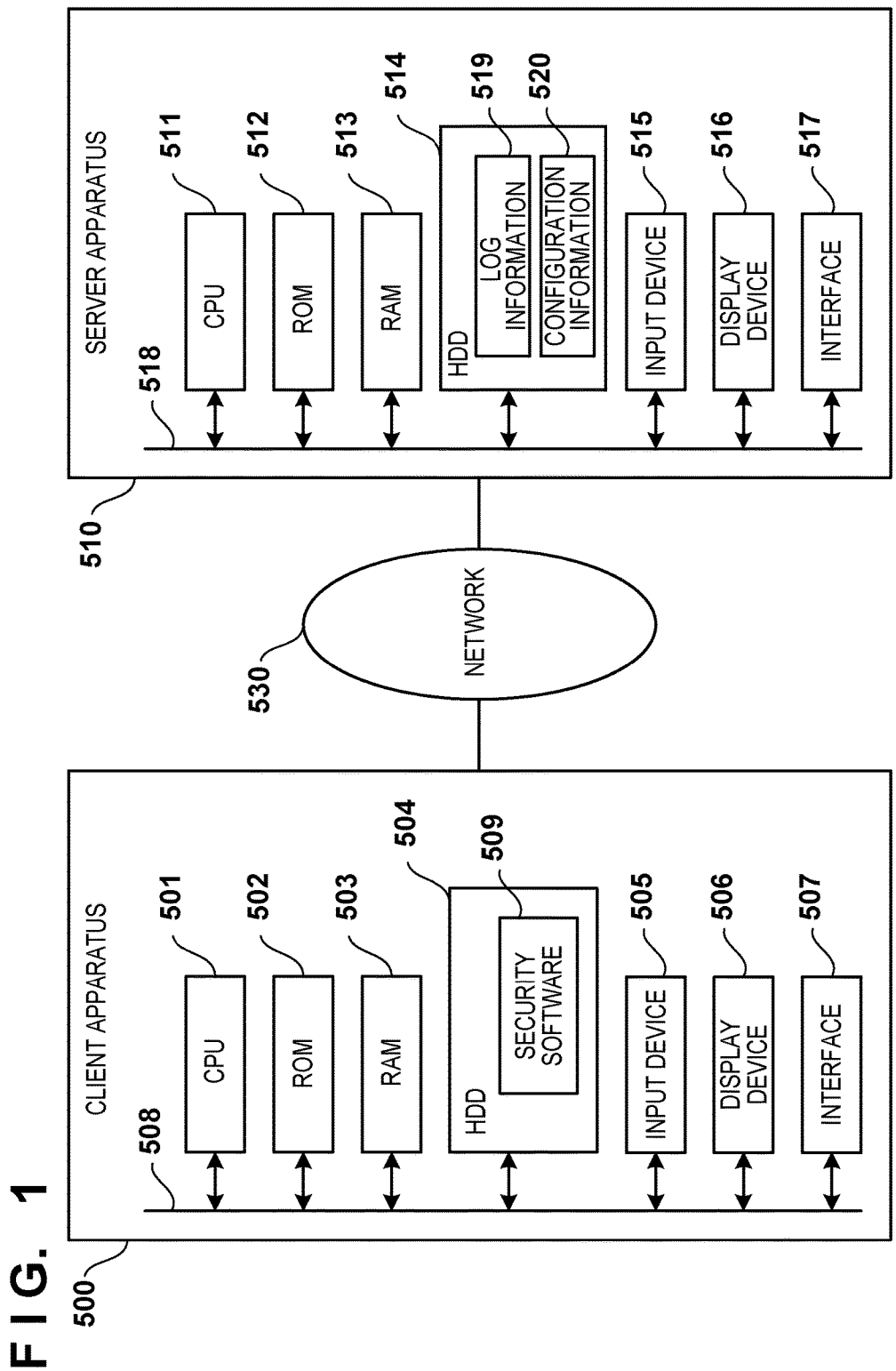
FIG. 1 is a block diagram showing the configuration of an information processing system according to an embodiment.

FIG. 1 is a block diagram showing the configuration of an information processing system according to the first embodiment of the present invention. As shown in FIG. 1, the information processing system includes a terminal apparatus operating as a client (to be referred to as a client apparatus) 500, a terminal apparatus operating as a server (to be referred to as a server apparatus) 510, and a network 530. Each terminal apparatus is an information processing apparatus such as a personal computer or portable information terminal. In the embodiment, each terminal apparatus is implemented by a personal computer. The client apparatus 500 is connected to the server apparatus 510 via the network 530.

[Client Apparatus]

The client apparatus 500 includes, for example, a CPU (Central Processing Unit) 501, ROM (Read Only Memory) 502, RAM (Random Access Memory) 503, HDD (Hard Disc Drive) 504, input device 505, display device 506, interface 507, and system bus 508. In the client apparatus 500, a process communicating with an external apparatus operates, which will be described later.

The CPU 501 is a processor which controls each unit based on a computer program stored in the ROM 502 or HDD 504. The RAM 503 is a rewritable memory and functions as a work area. The ROM 502 is a nonvolatile storage element and stores firmware and the like. The HDD 504 is a large-capacity storage device and stores an operating system, application program, and the like. Note that security software 509 and the like are also stored in the HDD 504.

The security software 509 monitors the client apparatus 500, and provides a function of acquiring the log of access to an external apparatus and controlling access, details of which will be described later.

The CPU 501 and each unit transmit/receive instructions and data via the system bus 508. The interface 507 is a communication circuit for communicating with another terminal apparatus via the network 530.

[Server Apparatus]

The server apparatus 510 includes, for example, a CPU 511, ROM 512, RAM 513, HDD 514, input device 515, display device 516, interface 517, and system bus 518. The server apparatus 510 operates as a management apparatus which manages the operation of the client apparatus 500. Building components having the same names as those of the building components of the client apparatus 500 have functions equivalent to those of the building components of the above-described client apparatus 500.

Note that log information 519, configuration information 520, and the like are also stored in the HDD 514 of the server apparatus 510. The log information 519 records access log information of the client apparatus 500 that has been collected from the client apparatus 500. The configuration information 520 stores information about, for example, whether to record the log for each user or each process, a process capable of accessing an external apparatus, and its connection destination. The connection destination is specified by, for example, a URL (Uniform Resource Locator), and permission/inhibition of access is designated based on a black list indicating access inhibition, a white list indicating access permission, and the like. Note that the client apparatus 500 may hold the log information 519 and configuration information 520.

The following description assumes that the client apparatus 500 and server apparatus 510 are personal computers, but the present invention is not limited to this. The types and models of the client apparatus 500 and server apparatus 510 are not limited as long as the client apparatus 500 and server apparatus 510 are devices having processing performance equal to or higher than that of a general personal computer or complying with it.

(Generation of Event in IP Communication)

Figure 2:
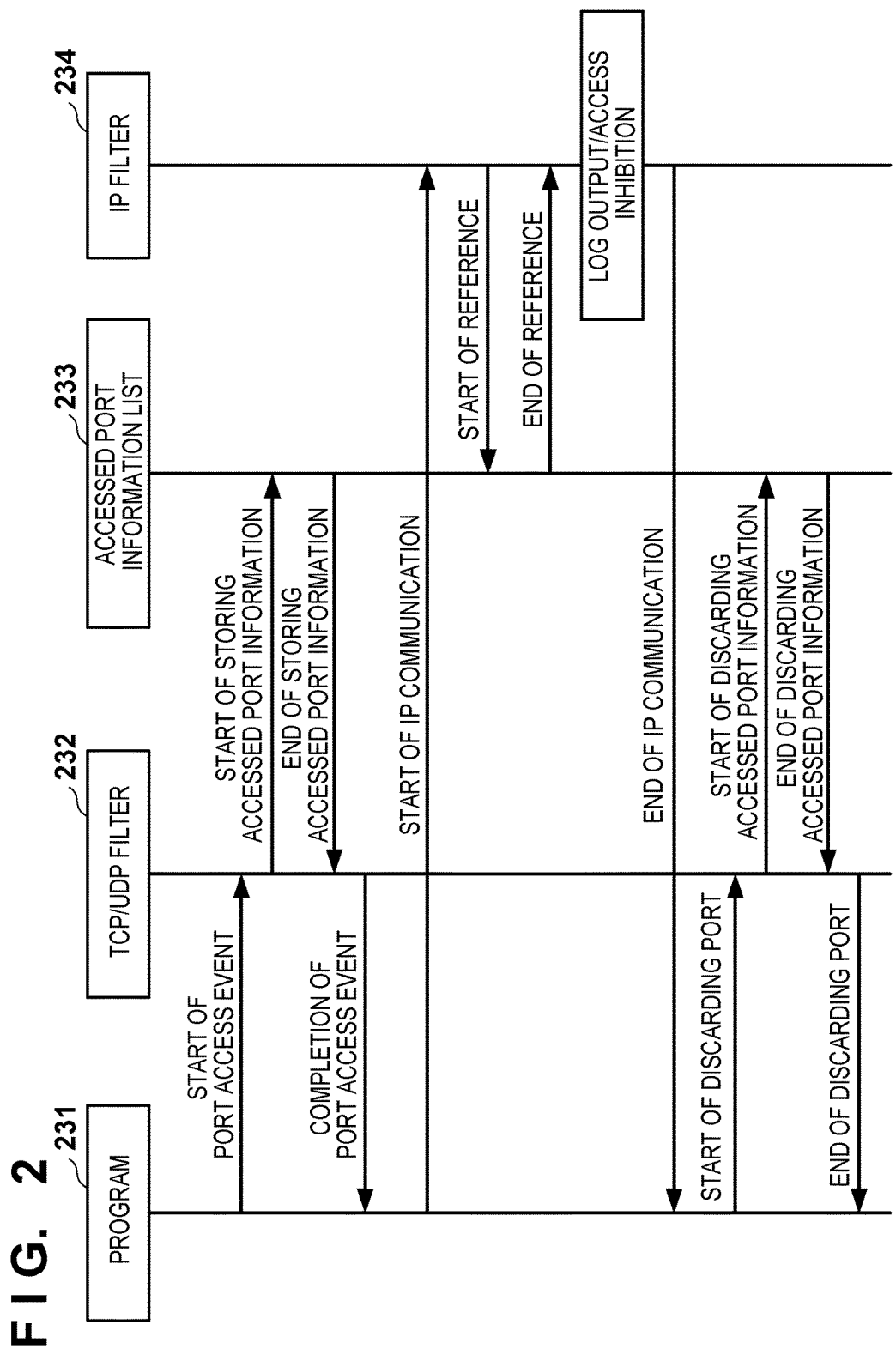
FIG. 2 is a conceptual chart showing generation of an event in IP communication according to an embodiment.

FIG. 2 is a conceptual chart showing generation of an event in IP (Internet Protocol) communication. FIG. 2 schematically shows communication between programs in the client apparatus 500. As shown in FIG. 2, the security software 509 includes a TCP (Transmission Control Protocol)/UDP (User Datagram Protocol) filter 232, accessed port information list 233, and IP filter 234.

The TCP/UDP filter 232 detects access to the TCP port or UDP port from an arbitrary program (process such as Web browsing software) 231. The TCP/UDP filter 232 stores port information of detected TCP or UDP port access in the accessed port information list 233 as accessed port information associated with the accessing process. Note that the port information is information containing, for example, the IP address and port number, and the accessed port information is information containing the correspondence between port information of a port and a process which accessed the port. The accessed port information may further contain user information regarding the process.

Upon detecting the start of IP communication, the IP filter 234 specifies, for example, a process, user, and the like by referring to the accessed port information list 233. Then, the IP filter 234 outputs an access log and controls access.

Upon detecting discard of the TCP or UDP port from the arbitrary program 231, the TCP/UDP filter 232 discards accessed port information of the discarded port from the accessed port information list 233.

In the embodiment, port information (for example, URL, IP address, and port number) used in communication and a communication source process (activation program) are associated between access to the TCP/UDP port and a subsequent discard event of the port.

In the embodiment, identification information for identifying a process is acquired. In addition, port information indicating the characteristic of a communication port used by the process to communicate with an external apparatus is acquired. Then, the acquired port information and process identification information are stored in correspondence with each other. According to the embodiment, access to an external apparatus can be grasped and managed for each process. This enables finer communication analysis and access control, compared to simply recording a communication log.

(Program Monitoring Processing)

Figure 3:
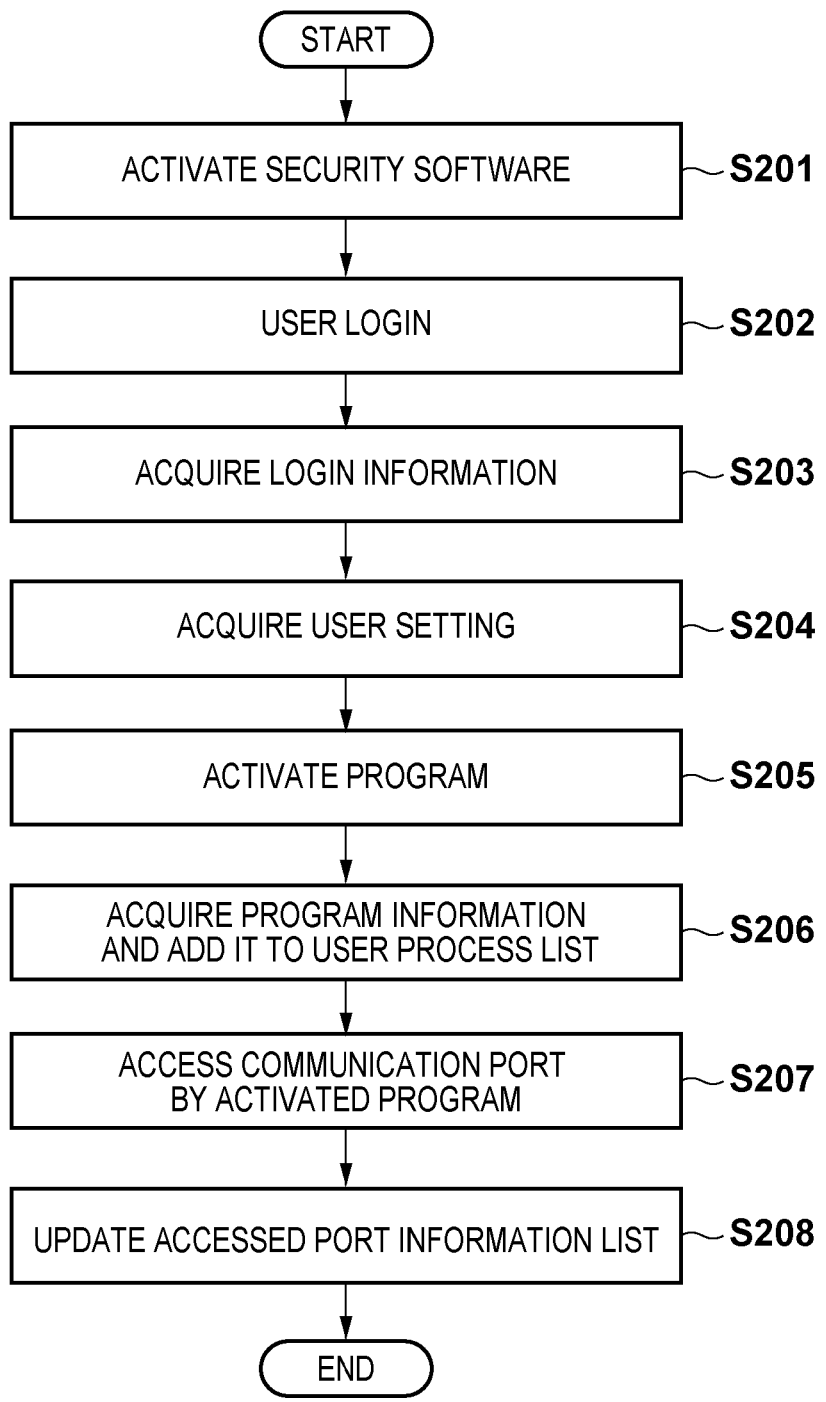
FIG. 3 is a flowchart showing program monitoring processing in a terminal apparatus according to an embodiment.

FIG. 3 is a flowchart showing program monitoring processing to be executed in the client apparatus 500.

In step S201, the client apparatus 500 activates the security software 509. The security software 509 can be activated automatically as a service program or arbitrarily by the user.

In step S202, the user logs in to the client apparatus 500. The user logs in by inputting an account name or user name, a corresponding password, and the like.

In step S203, the client apparatus 500 acquires user information of the logged-in user. The user information is a value capable of uniquely identifying a user, such as an account name, domain name, or user name.

In step S204, the client apparatus 500 communicates with the server apparatus 510 using the user information acquired in step S203, and acquires the user setting of the logged-in user from the configuration information 520 in the server apparatus 510. If the user has not been registered, the server apparatus 510 sends back default information or the like.

In step S205, the client apparatus 500 activates an arbitrary program such as Web browsing software in accordance with an instruction from the logged-in user. At this time, the security software 509 detects the activation of the program. Note that activation of the program is detected not only upon activation based on a user instruction but also upon activation by, for example, automatic update or virus infection.

In step S206, the client apparatus 500 acquires information of the program activated in step S205. The acquired information contains a program name, the account name of a user who has activated the program, a domain name, a process ID, and a session ID. From the information and the user information acquired in step S203, the client apparatus 500 adds the program information to a user process list describing the correspondence between the process and user information. In this manner, the first acquisition processing is performed to acquire identification information for identifying a process. Note that information to be acquired is not limited to information of an activated program, and information of a program which has accessed a port can also be acquired.

In step S207, the client apparatus 500 accesses a port to be used in IP communication by executing the activated program. The access means processing such as port creation, write, read, or discard. At this time, the security software 509 acquires port information of the accessed communication port. The port information is information containing port information such as the communication port type (for example, TCP or UDP) and the port number of the communication port. The port information is collected by, for example, filtering the TCP port driver or UDP port driver, hooking an API (Application Programming Interface) which has accessed a port by an API hook, or using an OS standard port monitoring interface (for example, Windows Filtering Platform).

By acquiring the communication port type, a plurality of protocols can be monitored simultaneously, and more detailed analysis can be made. For example, the HTTP protocol can be monitored by monitoring the TCP port, and the DNS protocol can be monitored by monitoring the UDP port. A combination of an HTTP request and a machine name or the like obtained from the DNS enables detailed analysis of Web access or the like using not the IP address but the machine name. Further, log acquisition can be controlled and access can be limited for each protocol.

In step S207, in response to access to a communication port used by the process to communicate with an external apparatus, the second acquisition processing is executed to acquire port information indicating the characteristic of the communication port. Finally, in step S208, accessed port information is generated from the port information acquired in step S207 and the user process list created in step S206, and the accessed port information list 233 is updated. As details of the processing of acquiring accessed port information, the detailed procedures of filtering of the TCP/UDP port driver, those of the API hook, and those of the OS standard port monitoring interface will be explained.

[Filtering of TCP/UDP Port Driver]

Figure 4:
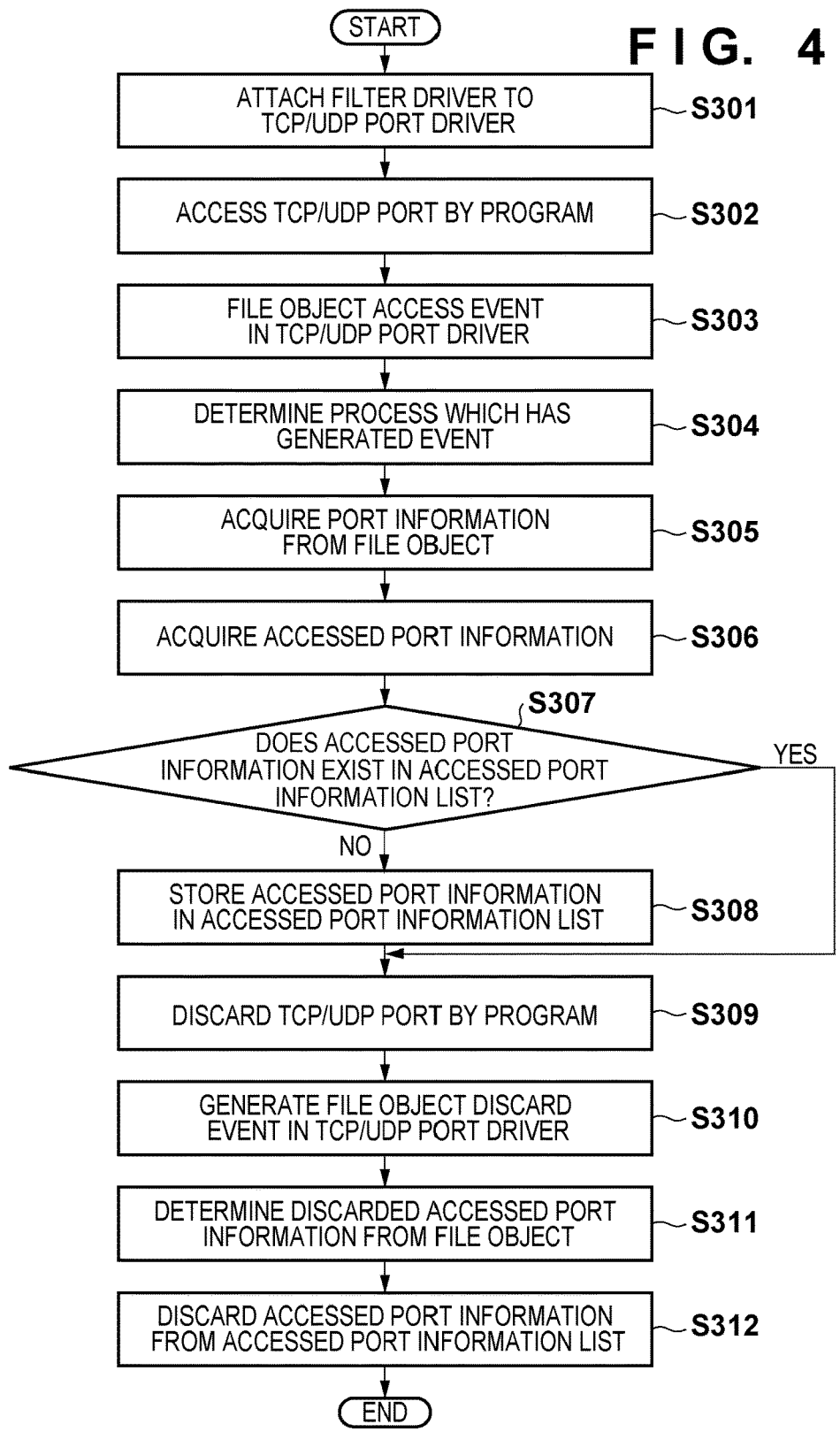
FIG. 4 is a flowchart showing processing of filtering a TCP port driver and creating a correspondence list of the process ID and communication port information according to an embodiment.

FIG. 4 is a flowchart showing processing procedures to filter the TCP port driver and UDP port driver and create a correspondence list of the process ID and communication port information. This processing acquires accessed port information by filtering the input/output of driver software used by a process to use a communication port. The client apparatus 500 executes the following steps. In the following processing, filtering is executed using the TCP port driver and UDP port driver. However, filtering may be performed using only the TCP port driver or UDP port driver.

In step S301, a filter driver created by the security software 509 is attached to the TCP port driver and UDP port driver. The timing of attachment is the start of monitoring or the like. Attaching the filter driver to the TCP port driver and UDP port driver means processing of starting filtering of data transmission via the TCP port and UDP port.

In step S302, an arbitrary program accesses the TCP port or UDP port for communicating with an external apparatus.

In step S303, the filter driver attached by the security software 509 is notified of an event such as creation, write, or read of a file object. The file object is an object which stores information about a file, device, and directory. For example, the file object stores a file path, file name, access right to a file, and device information.

In step S304, information for determining a process which has created the file object is acquired from the event information. In step S305, port information is acquired from the file object. This port information represents the port type, IP address, and port number.

In step S306, accessed port information is created from the process ID, communication port information, file object, and the like acquired in steps S304 and S305. If it is determined in step S307 that the same accessed port information (having the same process ID, port type, IP address, port number, and the like) exists in the accessed port information list 233, the created accessed port information is not added to the list or overwrites the information in the list. The process then shifts to step S309. Note that overwrite of the list information includes update of existing information to created information, addition of created information after deleting existing information, or deletion of existing information after adding created information. When the same accessed port information exists in the list, information may be added to the list together with the time, sequence number, or the like so that the newly added information can be identified, and the new information may be preferentially used upon search within the list. If it is determined in step S307 that the same accessed port information does not exist, the created accessed port information is stored in the list in step S308, and the process shifts to step S309.

If the activation program discards the TCP/UDP port in step S309, the filter driver attached by the security software 509 is notified of the file object discard event in step S310.

In step S311, accessed port information to be deleted is determined from a file object to be deleted by the file object discard event. In step S312, the accessed port information specified as the deletion target is deleted from the accessed port information list 233. If pieces of target information have been registered, all of them are deleted. Accessed port information may be deleted not in response to the file object discard event but at a predetermined interval.

As a result, a list of the TCP port and corresponding process ID can be created in real time. Although the TCP port driver has been described, a corresponding list can be created even in the UDP port driver or another driver.

In the above-described form, the file object discard event is monitored, and accessed port information is deleted from the accessed port information list 233. However, as another form, no file object discard event may be monitored, which will be described with reference to FIG. 5.

Figure 5:
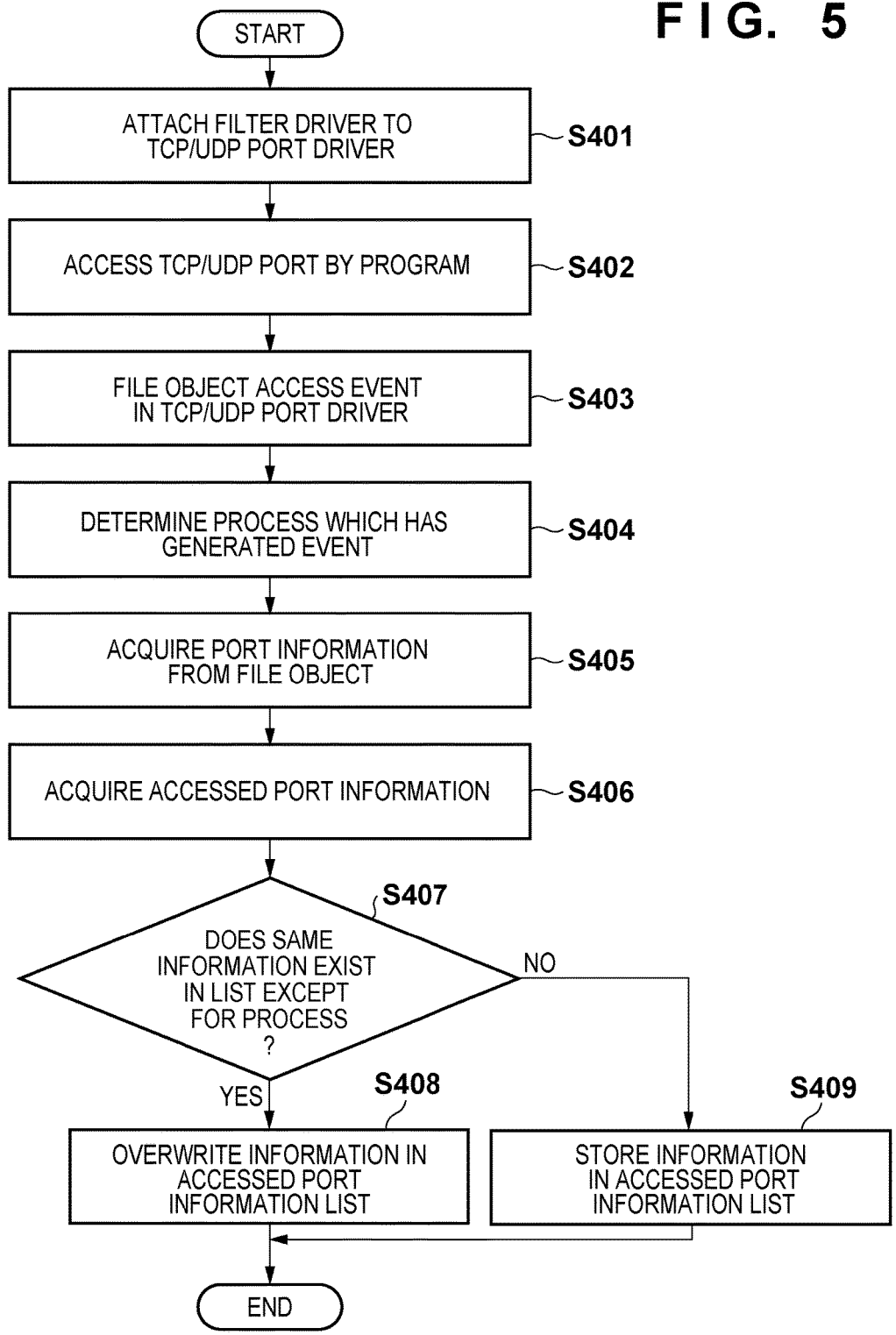
FIG. 5 is a flowchart showing processing of filtering a TCP port driver and creating a correspondence list of the process ID and communication port information according to an embodiment.

Note that processes in steps in S401 to S406 of FIG. 5 are the same as those in steps S301 to S306 of FIG. 4, and a description thereof will not be repeated.

If it is determined in step S407 that the same accessed port information except for the process ID exists, the process shifts to step S408 to overwrite the information in the list. When the same accessed port information except for the process ID exists, information may be added to the list together with the time, sequence number, or the like so that the newly added information can be identified, and the new information may be preferentially used upon search within the list.

If NO in step S407, the accessed port information is added and stored in the accessed port information list 233 in step S409. This processing can implement a configuration which does not monitor the file object discard event.

[API Hook]

Figure 6:
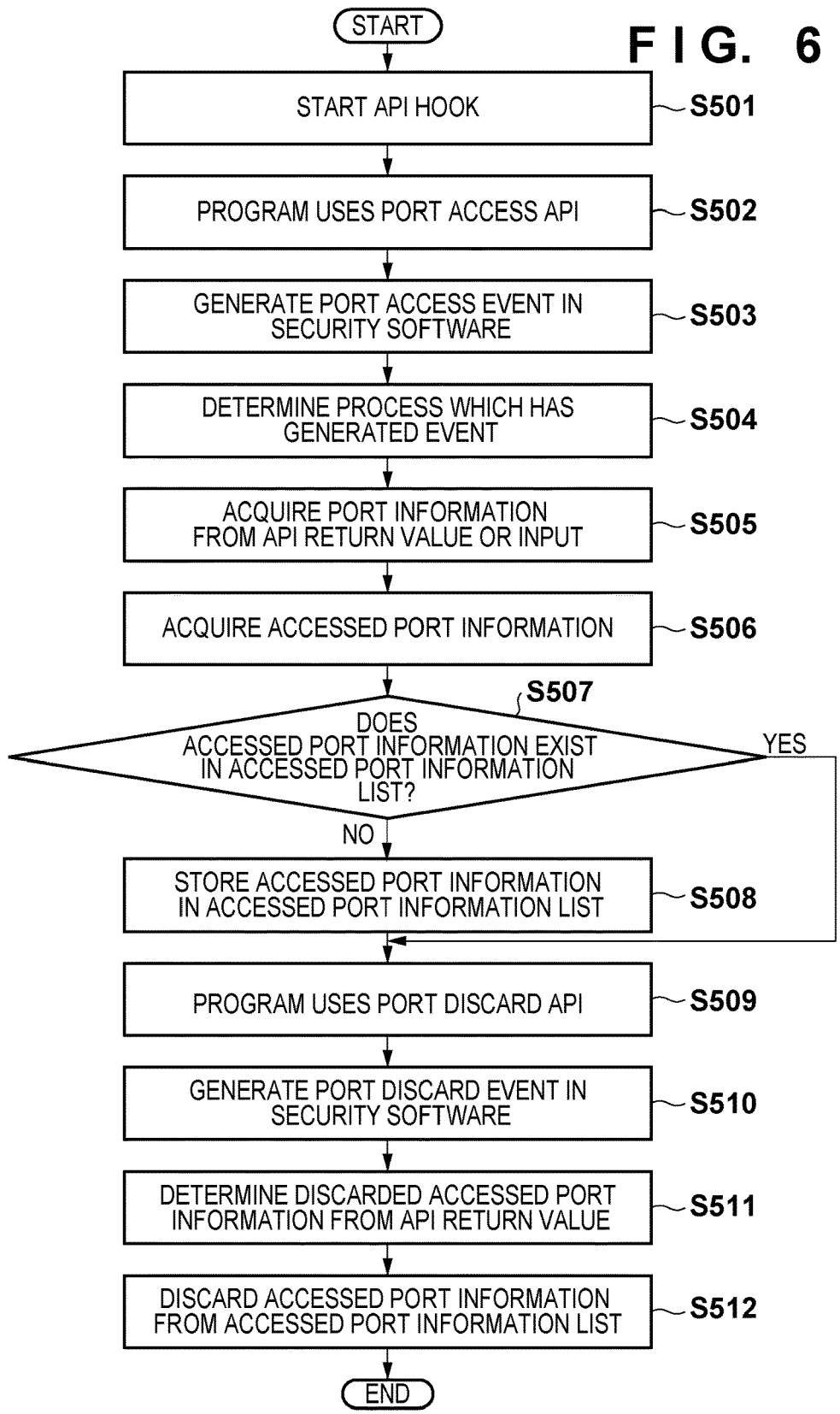
FIG. 6 is a flowchart showing processing of creating a correspondence list of the process ID and communication port information using an API hook according to an embodiment.

FIG. 6 is a flowchart showing processing procedures to create a correspondence list of the process ID and communication port information using an API hook. This processing acquires accessed port information by monitoring communication between a process and an application programming interface used to access (create and discard) a communication port.

In step S501, the security software 509 hooks a port creation API, port discard API, or the like. The timing of hooking is the start of port monitoring or the like. The API to be hooked is, for example, bind, connect, or closesocket of WinSockAPI.

An arbitrary program uses a port access API (for example, creation, write, or read) in step S502, and generates an event to hook the port access API in the security software 509 in step S503. Hooking an API means intercepting a call for the API by another object. The API hook is executed by rewriting an address used to call an API with a specific address.

In step S504, a process used by the API is acquired from the event information. In step S505, port information is acquired from the API return value or input. This port information represents the port type, IP address, and port number.

In step S506, accessed port information is created from the process ID, communication port information, handle information, and the like acquired in steps S504 and S505. If it is determined in step S507 that the same accessed port information exists in the accessed port information list 233, the created accessed port information is not added to the list or overwrites the information in the list. Then, the process shifts to step S509. When the same accessed port information exists in the list, information may be added to the list together with the time, sequence number, or the like so that the newly added information can be identified, and the new information may be preferentially used upon search within the list. If it is determined in step S507 that the same accessed port information does not exist, the created accessed port information is stored in the list in step S508, and the process shifts to step S509.

The arbitrary program uses the port discard API in step S509, and generates a port discard API hook event in the security software 509 in step S510.

In step S511, accessed port information to be deleted is determined from handle information to be deleted. In step S512, the target accessed port information is deleted from the accessed port information list. If pieces of target information have been registered, all of them are deleted. Accessed port information may be deleted not in response to the port discard API hook event but at a predetermined interval.

By this processing, a list of the communication port and corresponding process ID can be created in real time. Although the WinSockAPI hook has been described, the accessed port information list 233 can also be created even using another API.

In the above-described form, the port discard API hook event is monitored, and accessed port information is deleted from the accessed port information list 233. However, as another form, no port discard API hook event may be monitored, which will be described with reference to FIG. 7.

Figure 7:
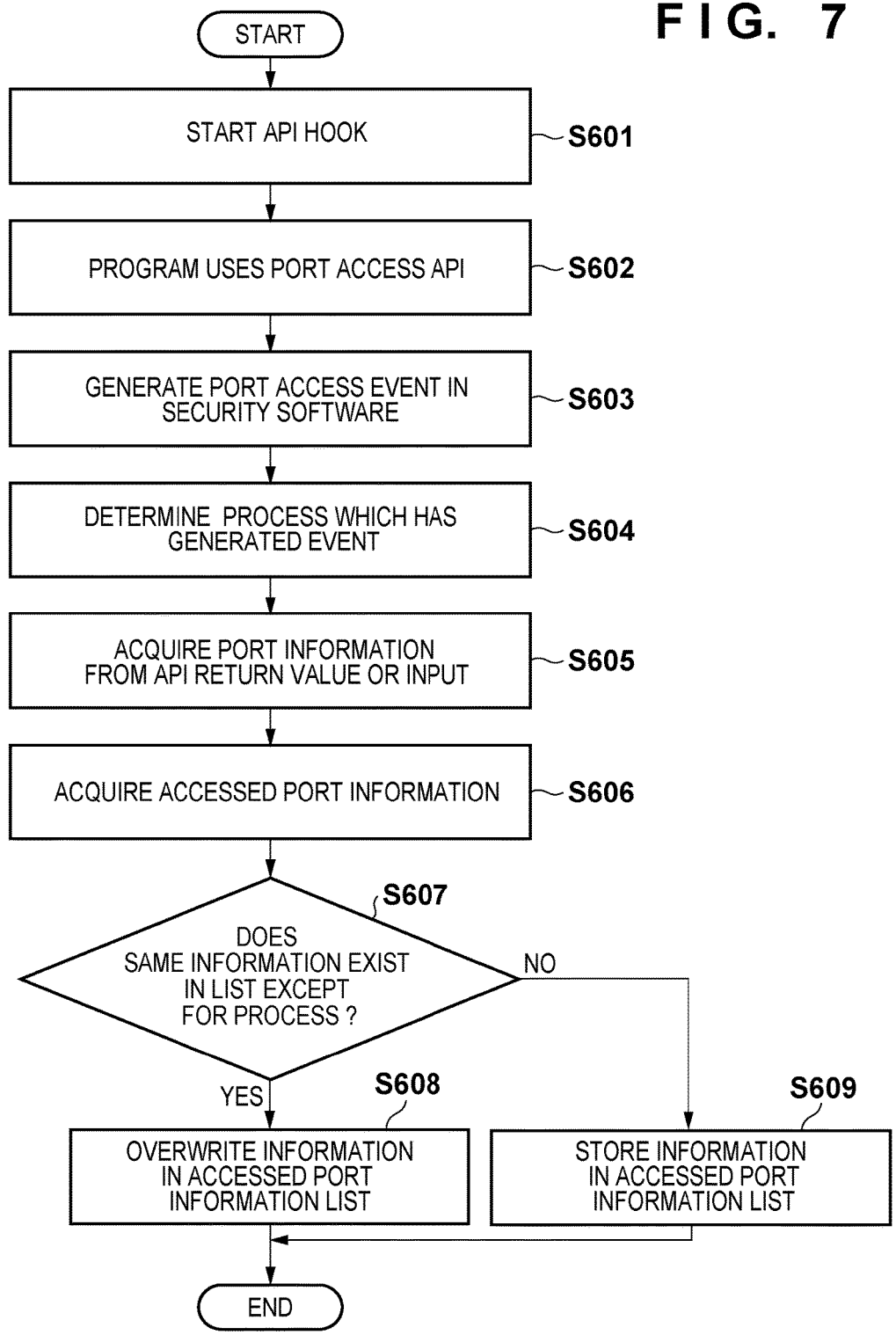
FIG. 7 is a flowchart showing processing of creating a correspondence list of the process ID and communication port information using an API hook according to an embodiment.

Note that processes in steps in S601 to S606 of FIG. 7 are the same as those in steps S501 to S506 of FIG. 6, and a description thereof will not be repeated.

If it is determined in step S607 that the same accessed port information except for the process ID exists, the information is overwritten in step S608. When the same accessed port information except for the process ID exists, information may be added to the list together with the time, sequence number, or the like so that the newly added information can be identified, and the new information may be preferentially used upon search within the list. If NO in step S607, the accessed port information is stored in the accessed port information list 233 in step S609.

This processing can implement a configuration which does not monitor the port discard API hook event.

[OS Standard Port Monitoring Interface]

Figure 8:
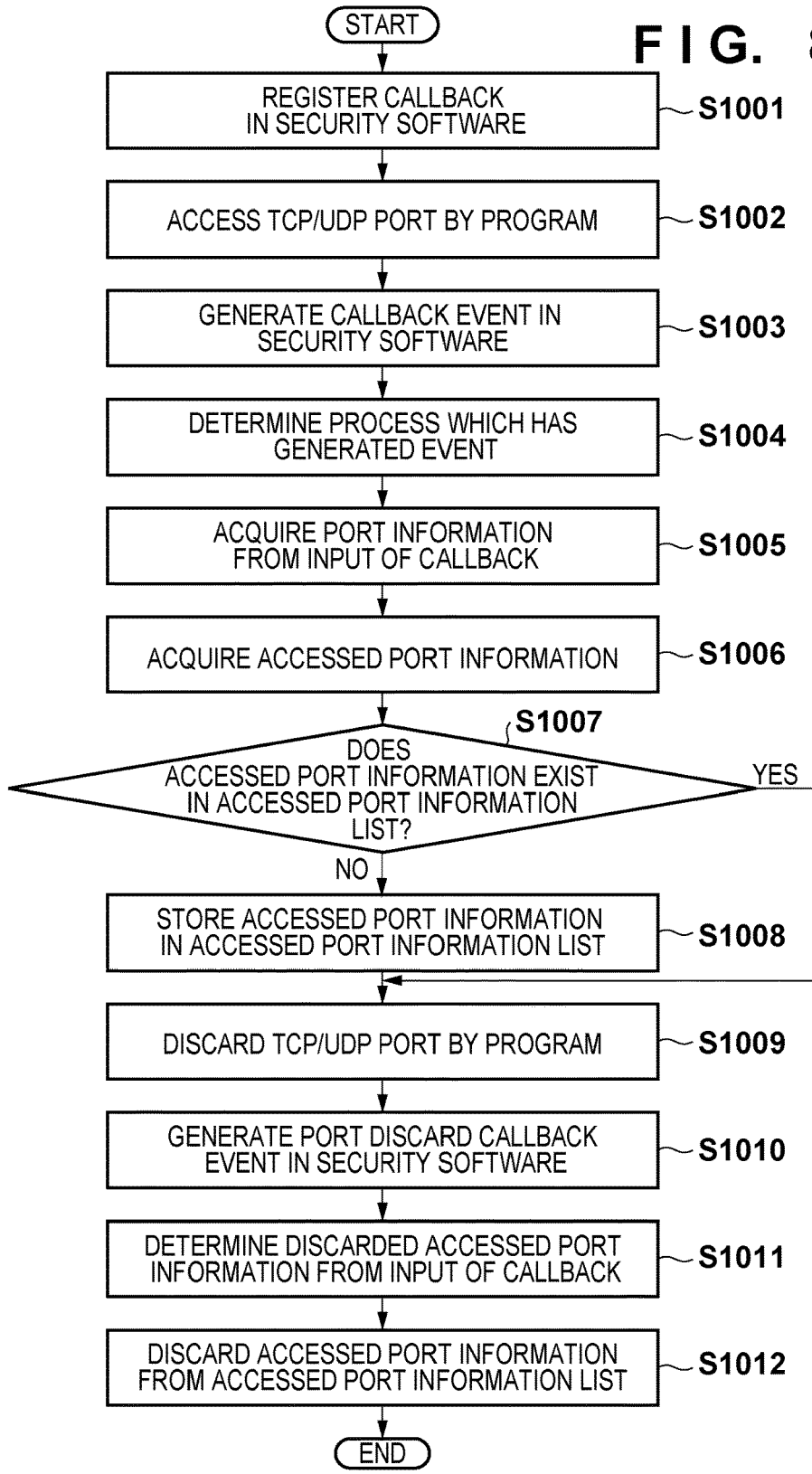
FIG. 8 is a flowchart showing processing of creating a correspondence list of the process ID and communication port information using an OS standard port monitoring interface according to an embodiment.

FIG. 8 is a flowchart showing processing procedures to create the accessed port information list 233 using the OS standard port monitoring interface. Note that the OS standard port monitoring interface is an interface such as Windows Filtering Platform which notifies the event of a port access (for example, creation, connection, discard, write, or read).

In step S1001, the security software 509 registers a callback called when a port access event occurs in the OS standard port monitoring interface.

In step S1002, an arbitrary program accesses a port. In step S1003, a callback for the port access occurs in the security software 509.

A process ID is acquired from the callback information in step S1004, and port information is acquired in step S1005. This port information represents the port type, IP address, and port number.

In step S1006, accessed port information is created from the process ID and port information acquired in steps S1004 and S1005. If it is determined in step S1007 that the same accessed port information exists in the accessed port information list 233, the created accessed port information is not added to the accessed port information list 233 or overwrites the information in the list. The process then shifts to step S1009. When the same accessed port information exists in the accessed port information list 233, information may be added to the list together with the time, sequence number, or the like so that the newly added information can be identified, and the new information may be preferentially used upon search within the list. If it is determined in step S1007 that the same accessed port information does not exist, the created accessed port information is stored in the list accessed port information list 233 in step S1008, and the process shifts to step S1009.

In step S1009, the arbitrary program discards the port. In step S1010, a callback for the port discard event occurs in the security software 509.

In step S1011, accessed port information to be deleted is determined from the callback information. In step S1012, the target accessed port information is deleted from the accessed port information list 233. If pieces of target information have been registered, all of them are deleted. Accessed port information may be deleted not in response to the callback for the port discard event but at a predetermined interval.

Accordingly, a list of the communication port and corresponding process ID can be created in real time.

In the above-described form, the callback for the port discard event is monitored, and accessed port information is deleted from the accessed port information list 233. However, as another form, no callback for the port discard event may be monitored, which will be described with reference to FIG. 9.

Figure 9:
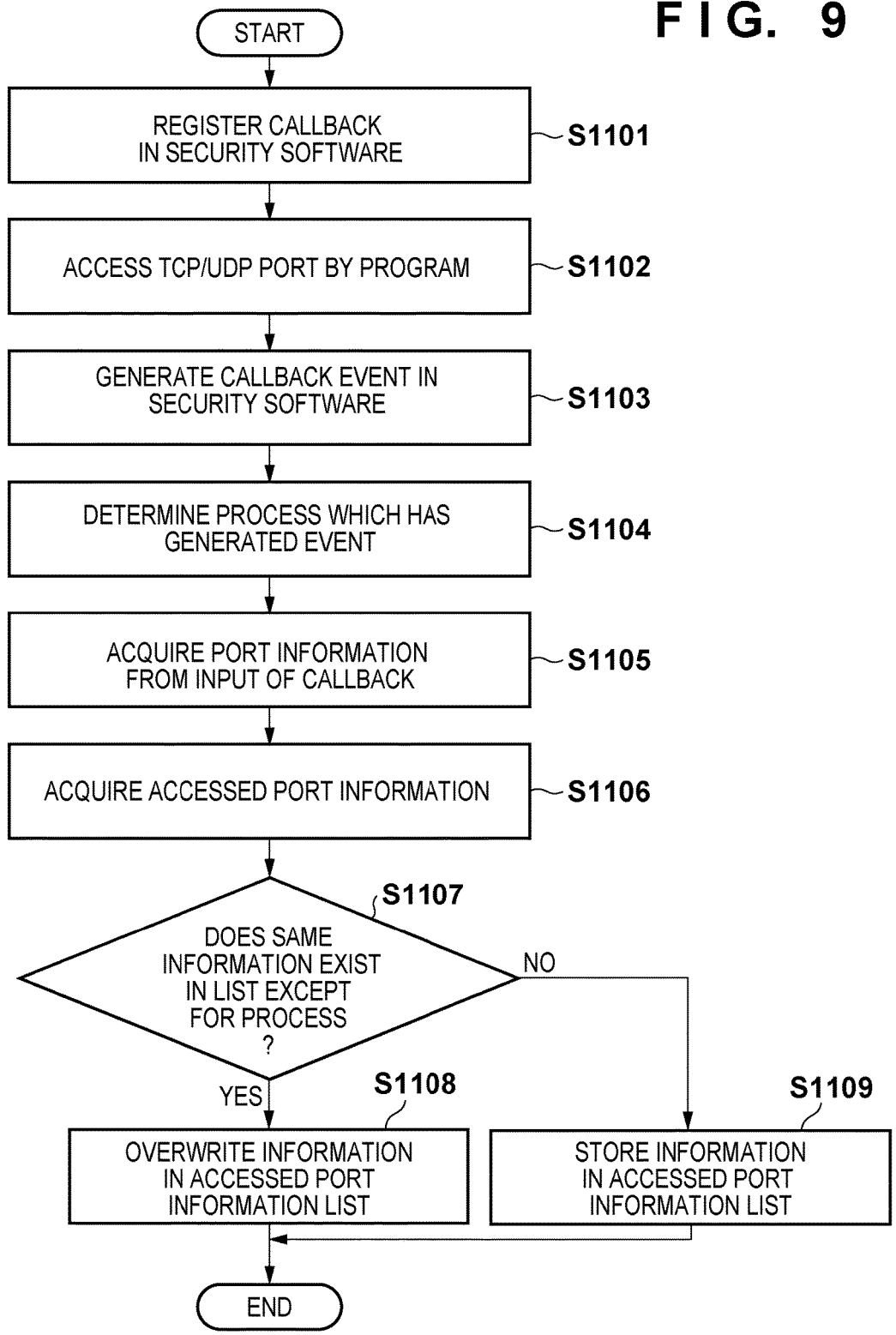
FIG. 9 is a flowchart showing processing of creating a correspondence list of the process ID and communication port information using an OS standard port monitoring interface according to an embodiment.

Note that processes in steps in S1101 to S1106 of FIG. 9 are the same as those in steps S1001 to S1006 of FIG. 8, and a description thereof will not be repeated.

If it is determined in step S1107 that the same accessed port information except for the process ID exists, the information is overwritten in step S1108. When the same accessed port information except for the process ID exists, information may be added to the list together with the time, sequence number, or the like so that the newly added information can be identified, and the new information may be preferentially used upon search within the list. If NO in step S1107, the accessed port information is stored in the accessed port information list 233 in step S1109.

This processing can implement a configuration which does not monitor the callback for the port discard event.

As processing of acquiring accessed port information, a list may be created in real time in access by the above-described method. Alternatively, accessed port information may be acquired in every predetermined time using a port information list acquisition API or file object information list API. The burden on the client apparatus 500 and network can be reduced by acquiring accessed port information in every predetermined time using the port information acquisition API or file object information list API. Next, the detailed procedures of a list creation method using the port information list acquisition API, and those of a list creation method using file object information of the TCP/UDP port driver will be explained.

[Port Information List Acquisition API]

Figure 10:
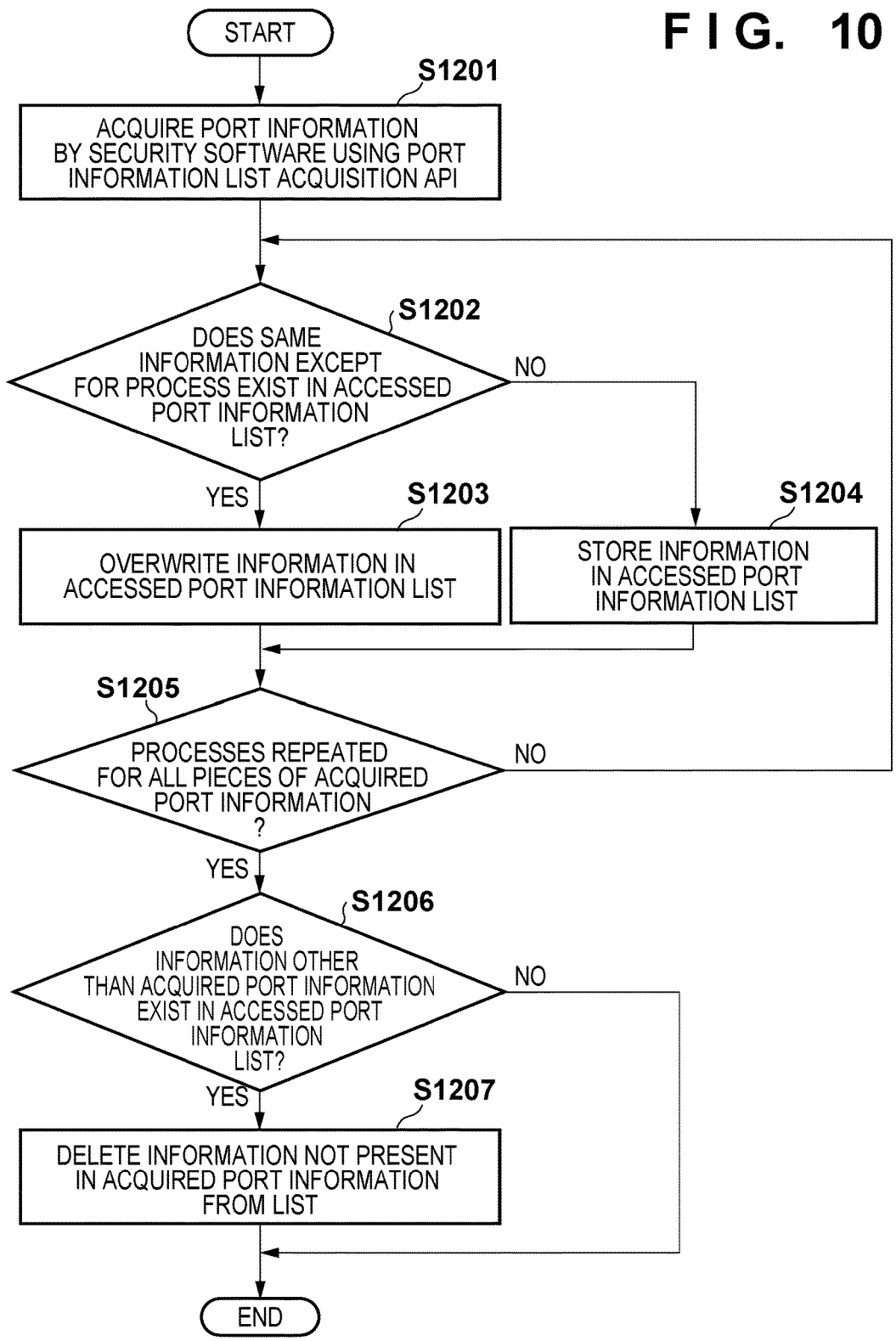
FIG. 10 is a flowchart showing processing of creating a correspondence list of the process ID and communication port information using a port information list API according to an embodiment.

FIG. 10 is a flowchart showing processing procedures to create the accessed port information list 233 using the port information list acquisition API at every predetermined interval.

In step S1201, the security software acquires an accessed port information list using the port information list acquisition API. If it is determined in step S1202 that the same accessed port information except for the process ID exists, the information in the list is overwritten in step S1203. When the same accessed port information except for the process ID exists in the list, information may be added to the list together with the time, sequence number, or the like so that the newly added information can be identified, and the new information may be preferentially used upon search within the list. If it is determined in step S1202 that the same accessed port information except for the process ID does not exist in the accessed port information list 233, the accessed port information is stored in the list in step S1204.

If it is determined in step S1205 that the processes in steps S1202 to S1204 have not been performed for all pieces of acquired accessed port information, the process returns to step S1202 to repeat the processes. After the end of repetition, it is checked in step S1206 whether information different from the information acquired using the API exists in the accessed port information list 233. If NO in step S1206, the process ends; if YES, information different from the information acquired using the API is deleted from the accessed port information list 233 in step S1207.

Hence, a list of the communication port and corresponding process ID can be created.

[File Object Information List Acquisition API]

Figure 11:
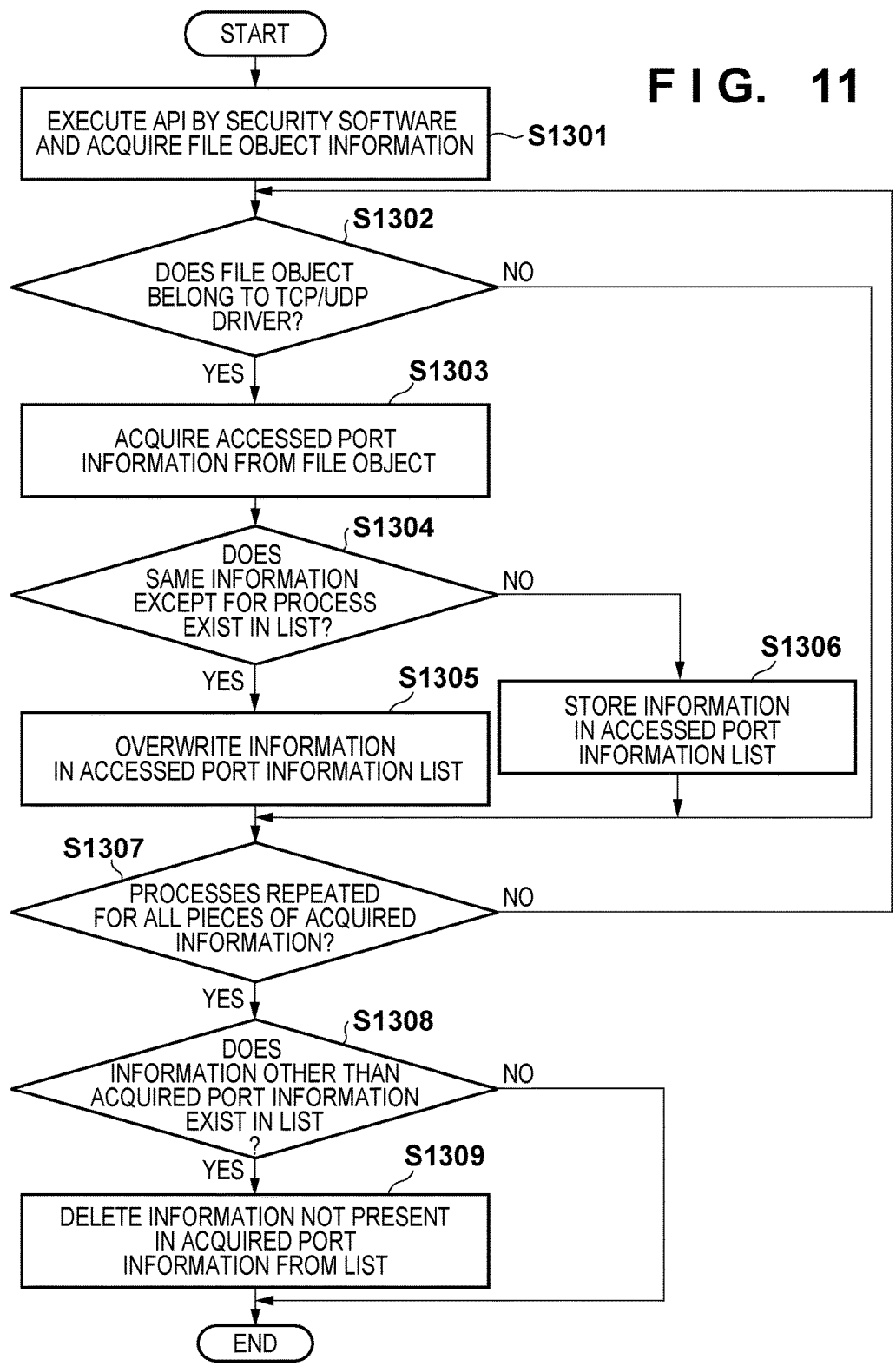
FIG. 11 is a flowchart showing processing of creating a correspondence list of the process ID and communication port information using a file information object list acquisition API according to an embodiment.

FIG. 11 is a flowchart showing processing procedures to acquire a file object list using the file object information list acquisition API at every predetermined interval, and create the accessed port information list 233. This API acquires the file objects of all drivers.

In step S1301, a file object list is acquired using the file object list acquisition API. In step S1302, it is determined whether the file object belongs to the TCP or UDP driver. If the file object does not belong to either driver, the process shifts to step S1307. If the file object belongs to either driver, accessed port information is acquired from the file object in step S1303.

If it is determined in step S1304 that the same accessed port information except for the process ID exists, the information in the list is overwritten in step S1305. When the same accessed port information except for the process ID exists in the list, information may be added to the list together with the time, sequence number, or the like so that the newly added information can be identified, and the new information may be preferentially used upon search within the list. If NO in step S1304, the accessed port information is stored in the accessed port information list 233 in step S1306.

If it is determined in step S1307 that the processes in steps S1302 to S1306 have not been performed for all the acquired file objects, the process returns to step S1302 to repeat the processes. After the end of repetition, it is checked in step S1308 whether information different from the accessed port information acquired in steps S1301 to S1307 exists in the accessed port information list 233. If NO in step S1308, the process ends; if YES, the different accessed port information is deleted from the accessed port information list 233 in step S1309.

As a result, a list of the communication port and corresponding process ID can be created.

(IP Communication Monitoring Processing)

FIG. 12 is a flowchart showing IP communication monitoring processing to be executed in the client apparatus 500.

In step S701, an arbitration activation program performs IP communication (Web access). In step S702, the security software 509 detects an event and acquires information. The acquired information includes communication port information used in IP communication and a communication destination URL. More specifically, IP packet filtering is performed to acquire communication port information from the header of the IP packet and data within the IP packet. The HTTP protocol is analyzed to acquire the communication destination URL.

(Web Access Log Acquisition Processing)

FIG. 13 is a flowchart showing Web access log acquisition processing to be executed in the client apparatus 500. This processing records log information of communication data communicated between a process and an external apparatus in association with port information and identification information of the process. In particular, a case in which information for identifying the user of the client apparatus 500 is input and log information is recorded in association with the information for identifying the user will be explained.

In step S801, a user and process which performed IP communication are determined from information acquired in step S702 and the accessed port information list 233 created in step S208. In step S802, the IP communication access log of the specified user is stored in the client apparatus 500. For example, the IP communication access log may be saved as a log file or held in the memory space.

In step S803, the user of the client apparatus 500 logs off. In step S804, the client apparatus 500 transmits, to the server apparatus 510, the IP communication access log recorded in step S802.

In the embodiment, the IP communication access log is recorded in the client apparatus 500 in step S802. However, the IP communication access log may be transmitted to the server apparatus 510 without recording it in the client apparatus 500.

In the server apparatus 510, the received IP communication access log is stored in the log information 519 so that the access log can be browsed.

The above configuration can associate port information and a process for each user. According to the embodiment, it can be selected whether to record the log of each process such that the log of Web browsing software is acquired but that of automatic update is not acquired. Recording of an unnecessary log can be reduced in accordance with the user environment. In the above processing, log information recorded in the client apparatus 500 is transmitted to a predetermined management apparatus (server apparatus 510). The server apparatus 510 can comprehensively manage the operations of the respective client apparatuses 500.

(Web Access Control Processing)

Figure 14:
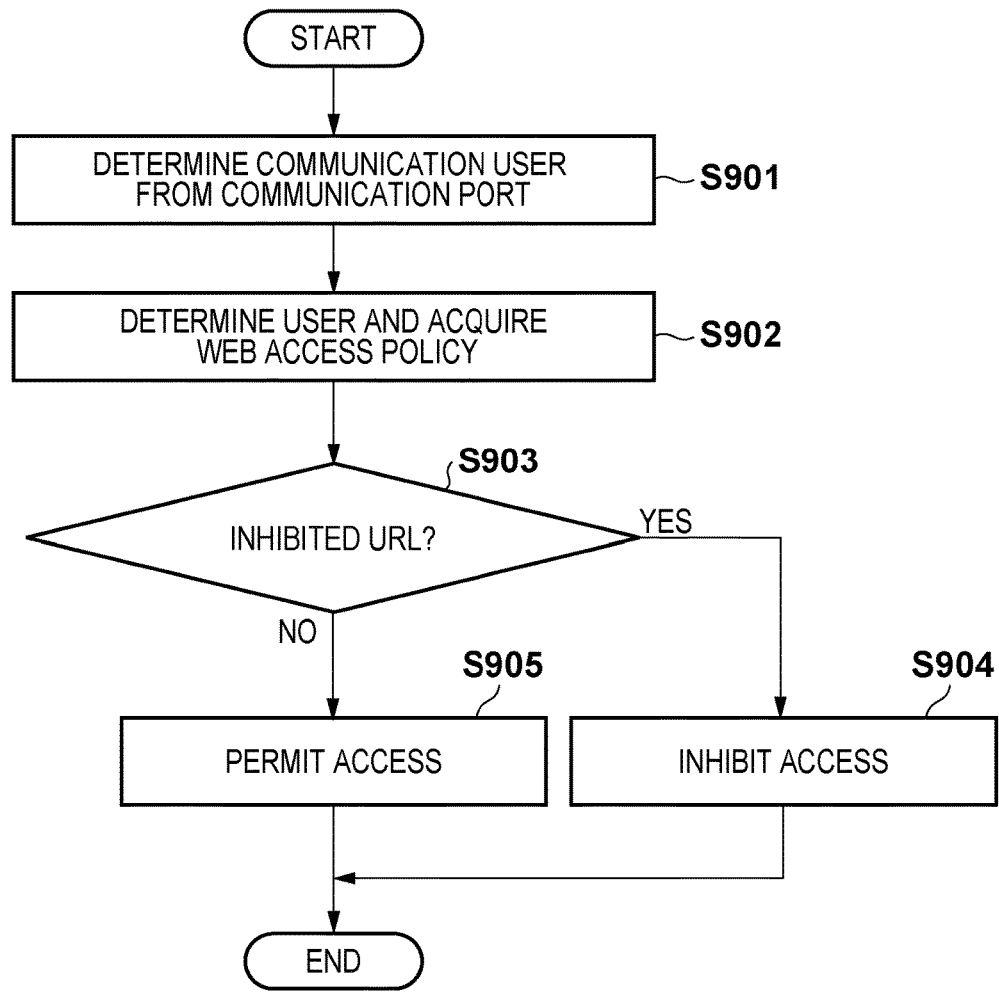
FIG. 14 is a flowchart showing access control processing in a terminal apparatus according to an embodiment.

FIG. 14 is a flowchart showing Web access control processing to be executed in the client apparatus 500. In this processing, information for determining the user of an information processing apparatus is input. Based on at least either of the information for determining the user and information for determining a process, the process is inhibited from accessing a predetermined external apparatus.

In step S901, a user and process which performed access are determined from information acquired in step S702 and the accessed port information list 233 created in step S208.

In step S902, a user setting (Web access right) acquired in step S204 is obtained from the determined user.

In step S903, it is checked whether to permit generated access to an external apparatus. If there is no access right (YES in step S903), the process advances to step S904 to inhibit Web access. For example, the access is inhibited by discarding a packet or rewriting it with meaningless data.

If there is an access right (NO in step S903), the process advances to step S905 to permit Web access.

As described above, the embodiment can associate port information and a process for each user. The embodiment can implement Web access control suited to the user environment to, for example, permit only Web access for automatic update but inhibit another Web access.

Second Embodiment

The second embodiment will explain a configuration and operation in which the security software 509 in the first embodiment is used for a terminal service. In the second embodiment, a process running on a client apparatus performs processing of remote-controlling an application executed in an external apparatus.

Note that most part of the operation in the second embodiment is common to the operation in the first embodiment. Only a configuration and operation different from those in the first embodiment will be explained, and a description of a common operation will not be repeated.

The terminal service is a service which allows a client computer to remote-connect to a server computer and execute an application program on the server computer using a virtual desktop environment generated on the server computer.

FIG. 15 is a block diagram showing the overall configuration of an information processing system (terminal service) simultaneously usable by a plurality of users according to the second embodiment. The system according to the second embodiment includes a plurality of terminal apparatuses (setting server apparatus 510, server apparatus 20, and client apparatuses 210 and 220) each serving an example of an information processing apparatus. These terminal apparatuses are connected via a network 230 such as a LAN.

An operating system (OS) 202 including a terminal service providing unit 201 runs on the server apparatus 20. Security software 509 is installed in the server apparatus 20. The security software 509 is a program which provides an Internet access control function, and runs on the server apparatus 20.

The terminal service providing unit 201 is implemented by, for example, a program called a terminal server. The server apparatus 20 includes an authentication information storage unit 203. The authentication information storage unit 203 stores login user information (for example, login user name and session ID) of the users of the client apparatuses 210 and 220.

The client apparatuses 210 and 220 include terminal service utilization units 211 and 221 for utilizing terminal services provided from the terminal service providing unit 201, respectively. An input unit such as a keyboard, and a display unit such as a display device (neither is shown) are connected to each of the client apparatuses 210 and 220. The terminal service utilization units 211 and 221 are implemented by a program called a remote desktop connection (RDC) or a program called a terminal service client (TSC). In general, the terminal service is provided by a general operating system (OS) such as Windows®, MacOS, and Linux, but its name differs between the OSs.

The remote service is a service which allows the second personal computer (PC) to log in to the first PC and remote-control the first PC. For example, the second PC acquires information from the first PC, writes information in the first PC, or executes, on the first PC, software installed in the first PC. Note that a user who directly logs in to the first PC via the input unit of the first PC will be called a local user, and a user who logs in to the first PC from the remote second PC will be called a remote user, in order to discriminate them.

The server apparatus 20 functioning as a server transmits, to the client apparatuses 210 and 220 each functioning as a client, information for displaying a virtual desktop screen. The client apparatuses 210 and 220 display the virtual desktop screens on the display devices in accordance with the information received from the server apparatus 20, and transmit commands and data to the server apparatus 20 in accordance with operations by users on the virtual desktop screens. The server apparatus 20 executes application programs in accordance with the commands and data transmitted from the client apparatuses 210 and 220, and transmits the execution results to the client apparatuses 210 and 220. The client apparatuses 210 and 220 display the execution results transmitted from the server apparatus 20 on the virtual desktop screens. The server apparatus 20 is used by the remote user and is also usable by the local user at the same time.

In the information processing system (terminal service) simultaneously usable by a plurality of users including the remote user and local user, the server apparatus 20 executes an application program. The client apparatuses 210 and 220 can also simultaneously connect to the server apparatus 20 and execute application programs. In this case, sessions are divided for respective remote users, and the respective users execute application programs using separate virtual desktop environments. The terminal service providing unit 201 issues session IDs to discriminate sessions. Note that simultaneous use includes a state in which a plurality of users log in at the same time. This terminal service is a general technique, and a further description thereof will be omitted.

Referring to FIG. 15, a log collection unit 521 in the setting server apparatus 510 records information of access to an external apparatus for each user that is used in the security software 509. A configuration unit 522 records configuration information for each user, such as a black list and white list of connectable URLs for each user. When the user logs in to the terminal 20, the security software 509 communicates with the terminal 510 at the timing of remote login or the like and acquires configuration information of the user.

(Program Monitoring)

In step S203 of FIG. 3, user information of a logged-in user is acquired. In this case, the user information contains the session ID.

In step S208, a list for each user in the information processing system (terminal service) simultaneously usable by a plurality of users is created in an accessed port information list 233.

As described above, according to the second embodiment, the log of each logged-in user can be acquired for Web access and an access right suited to each user can be given even in the information processing system simultaneously usable by a plurality of users.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-032560 filed Feb. 17, 2011 and 2011-266247 filed Dec. 5, 2011, which are hereby incorporated by reference herein in their entirety.

What is claimed is:

1. An information processing apparatus in which a process communicating with an external apparatus operates, comprising:
a processor; and
memory having a computer program, the computer program, when executed by the processor, causes the processor to perform operations comprising:
detecting an access event of a process to a communication port by a Transmission Control Protocol/User Datagram Protocol (TCP/UDP) filter;
acquiring identification information for identifying the process accessing the communication port in response to the detection of the access event by the TCP/UDP filter;
acquiring port information of the communication port accessed by the process in response to the detection of the access event by the TCP/UDP filter;
storing a list that associates the identification information for identifying the process accessing the communication port with the acquired port information of the accessed communication port;
acquiring a destination URL and port information included in an Internet Protocol (IP) packet regarding a communication by an IP filter;

associating the identification information for identifying the process and the associated port information in the list with the destination URL based on the port information included in the IP packet; and determining the process originating the communication based on the identification information for identifying the process that is associated with the destination URL.

2. The apparatus according to claim 1, wherein the operations further comprise: recording the associated port information, the identification information and the destination URL as log information.

3. The apparatus according to claim 2, wherein the operations further comprise: inputting information for identifying a user of the information processing apparatus, and recording the log information in association with the information for identifying a user.

4. The apparatus according to claim 3, wherein the operations further comprise transmitting the log information recorded to a predetermined management apparatus.

5. The apparatus according to claim 1, wherein the operations further comprise:

inhibiting the process originating the communication from accessing to a predetermined external apparatus, based on the identification information for identifying the process.

6. The apparatus according to claim 1, wherein another information processing apparatus indirectly logs in to the information processing apparatus via a network.

7. The apparatus according to claim 1, wherein the information processing apparatus is simultaneously usable by a plurality of users.

8. The apparatus according to claim 1, wherein the port information indicating a characteristic of a communication port includes a port type.

9. A method of controlling an information processing apparatus in which a process communicating with an external apparatus operates, comprising:

at a computer comprising a processor and memory storing a computer program for execution by the processor:

detecting an access event of a process to a communication port by a Transmission Control Protocol/User Datagram Protocol (TCP/UDP) filter;

acquiring identification information for identifying the process accessing the communication port in response to the detection of the access event by the TCP/UDP filter;

acquiring port information of the communication port accessed by the process in response to the detection of the access event by the TCP/UDP filter;

storing a list that associates the identification information for identifying the process accessing the communication port with the acquired port information of the accessed communication port;

acquiring a destination URL and port information included in an Internet Protocol (IP) packet regarding a communication by an IP filter;

associating the identification information for identifying the process and the associated port information in the list with the destination URL based on the port information included in the IP packet; and determining the process originating the communication based on the identification information for identifying the process that is associated with the destination URL.

10. A computer program which is stored in a non-transitory computer readable medium and causes a computer to function as an information processing apparatus defined in claim 1.

11. The apparatus according to claim 1, wherein the port information is acquired from a filtered file object.

12. The method according to claim 9, wherein the port information is acquired from a filtered file object.

13. The apparatus according to claim 1, wherein the port information is associated with the identification information and the destination URL from an access event to the communication port by the process until a subsequent discard event of the communication port.

* * * * *